(12) United States Patent
Saitoh

(10) Patent No.: US 6,339,460 B1
(45) Date of Patent: Jan. 15, 2002

(54) LIQUID CRYSTAL DISPLAY DEVICE

(75) Inventor: Yukito Saitoh, Sagamihara (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/350,627

(22) Filed: Jul. 9, 1999

(30) Foreign Application Priority Data

Jul. 15, 1998 (JP) ............................................. 10-200906

(51) Int. Cl.⁷ .......................... G02F 1/1333; G02F 1/13
(52) U.S. Cl. ........................ 349/117; 399/102; 399/178
(58) Field of Search ............................ 399/117, 96, 119, 399/178, 102

(56) References Cited

U.S. PATENT DOCUMENTS 6,061,116 A * 5/2000 Nishida et al. ............. 349/130

FOREIGN PATENT DOCUMENTS

JP 4-371903 12/1992
JP 10-153782 6/1998

* cited by examiner

*Primary Examiner*—Toan Ton
(74) *Attorney, Agent, or Firm*—Scully, Scott, Murphy & Presser; Marian Underweiser, Esq

(57) ABSTRACT

A vertical alignment liquid crystal display device capable of a complete contrast compensation, particularly by performing an optical compensation using an optically uniaxial anisotropic sheet and an optically biaxial anisotropic sheet. A retardation of the optically uniaxial anisotropic sheet should have an opposite sign to the retardation of a liquid crystal layer, and absolute value of the retardation of the optically uniaxial anisotropic sheet should be within the range of 75 to 100% of the retardation of the liquid crystal layer. The optically uniaxial anisotropic sheet may be united with a polarizing plate. The optically biaxial anisotropic sheet should have a retardation axis which is parallel to a transmitting axis of any one of the polarizing plates. The optically biaxial anisotropic sheet should exhibit an in-plane retardation of 190 to 390 nm, and exhibit a retardation of 0.28 to 0.67 in its thickness direction. The resulting vertical alignment liquid display device has a high contrast even when viewed from an oblique direction.

6 Claims, 6 Drawing Sheets

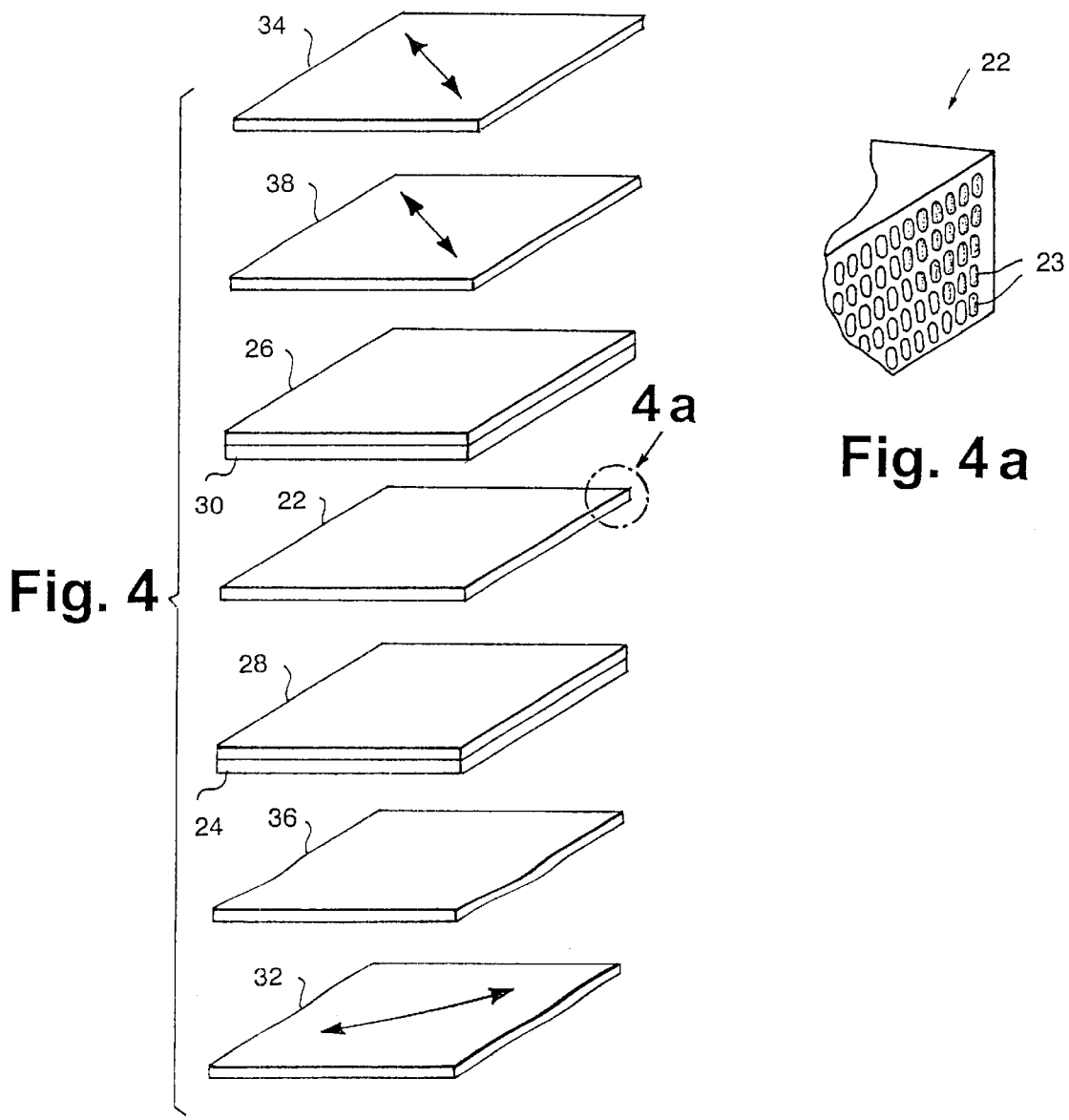

LIQUID CRYSTAL DISPLAY DEVICE

BACKGROUND OF THE INVENTION

1. Technical Field

The present invention relates to an active matrix type liquid crystal display device, more particularly to a so-called vertical alignment mode liquid crystal display device in which an electric field in a vertical direction is applied to a liquid crystal layer having liquid crystal molecules possessing a negative dielectric anisotropy, the molecules being oriented in the vertical direction, and the liquid crystal molecules are allowed to orient in a horizontal direction, thus controlling a light transmission/cutting-off.

2. Prior Art

A widely spread conventional display device using liquid crystal materials employs a liquid crystal layer of a twisted nematic liquid crystal. In this device, an electric field is applied in a direction perpendicular to the substrate. In this system, polarizing plates are arranged on the two sides of the liquid crystal layer in such a way that their polarizing axes are perpendicular. Liquid crystal molecules are oriented in a vertical direction when an electric field is applied and a black image display is acquired. However, upon the application of the electric field, a light transmitting obliquely through the liquid crystal layer in which the liquid crystal molecules are oriented in the vertical direction undergoes double refraction due to the liquid crystal molecules, and its polarizing direction is rotated. Therefore, there has been a problem that a perfectly black displaying can not be acquired when the display device is viewed obliquely, quality contrast of the display is lowered, and viewing angles at which a satisfactory image can be observed is narrow.

In order to solve such problem, a liquid crystal display device which utilizes a so-called in-plane switching (IPS) mode in which the direction of an electric field applied to a liquid crystal is parallel to the substrate has been recently proposed. In case of the IPS mode, since the liquid crystal molecules rotate primarily in a plane parallel to the substrate, the degree of a double refraction differs little when viewed obliquely in a state when the electric field is applied and when it is not applied. Consequently, it is known that view angle is widened. However, in the IPS mode liquid crystal display device, since a comb-shaped opaque electrode is, for example, provided on one of the substrates existing on both sides of the liquid crystal layer, this liquid crystal display device involves a problem that an aperture ratio decreases. The IPS mode liquid crystal display device having a low aperture ratio is disadvantageous for portable equipment such as a notebook type personal computer in which low power consumption is required, and so it is generally used at present as a standalone monitor equipment.

As a method to obtain a liquid crystal display device having a wide viewing angle and a high aperture ratio and thereby to solve the above described problems, a vertical alignment mode liquid crystal display device has been proposed. In this liquid crystal display device, a liquid crystal layer formed of liquid crystal molecules possessing a negative dielectric anisotropy is provided between two parallel plate type electrodes. The liquid crystal molecules are oriented perpendicularly to the electrodes when no voltage is applied to the electrodes. Moreover, the upper and lower polarizing plates are so arranged that their polarizing axes are perpendicular to each other. When the voltage is not applied, an incident light straightly travels through the liquid crystal layer, so that the light passes through one polarizing plate and is linearly polarized. This light is perfectly shielded by the other polarizing plate, and thus the display becomes black. When a voltage is applied, the liquid crystal molecules possessing a negative dielectric anisotropy are oriented in a direction perpendicular to the direction of the electric field, that is, the liquid crystal molecules are oriented in a direction parallel to the electrodes. In this case, since the incident light is rotated by the liquid crystal layer exhibiting a retardation, the linearly polarized light polarized by the polarizing plate travels through the other polarizing plate and the display becomes white.

In the vertical alignment mode liquid crystal display device, although a contrast when viewed from the front is extremely good, a contrast when viewed from upper and lower directions as well as left and right directions becomes worse as compared to that in the case of IPS mode liquid crystal display device. For this reason, an optical compensation sheet is employed, however, detailed studies have not been made as to the direction and magnitude of a retardation in an in-plane direction of the sheet, and the magnitude of a retardation in a direction perpendicular to the sheet. In SID'98, Chen et. al. disclose that a perfect compensation is possible by using two biaxial sheets (SID'98 DIGEST page 315). This aims at achieving a rotation of a polarizing axis by a retardation of about 50 nm in-plane direction. Although it was experimentarily confirmed that the optical compensation is possible according to this method, the reason of this was not perfectly made clear. Moreover, two optically biaxial anisotropic sheets provided on upper and lower sides of the liquid crystal display device are required.

The vertical alignment mode liquid crystal display device inherently has a drawback concerning a visual angle property. In the vertical alignment mode liquid crystal display device, by using liquid crystal molecules homogeneously oriented in a vertical direction and two polarizing plates disposed so that their transmitting axes intersect at a right angle, a black displaying is performed. When viewing obliquely as compared to the direction of the transmitting axis of the polarizing plates, the polarizing plates have a positional relationship in which the two transmitting axes look to intersect at a right angle and the homogeneous orientation liquid crystal layer exhibits a double refraction which is less as compared to in the twisted mode liquid crystal layer. Therefore, a completely black displaying can be achieved. On the contrary, when viewed obliquely from a direction that makes an angle of 45 degrees with the transmitting axis of the polarizing plate, as is apparent from the fact that the two polarizing plates have a positional relationship in which an angle formed by their transmitting axes looks to be shifted from 90 degrees, the transmitting light causes a double refraction and the light leaks. Therefore, a satisfactory black display can not be achieved, and the contrast is degraded. The vertical alignment mode liquid crystal device exhibits a small difference in retardation values between when viewed from a front direction and when viewed from an oblique direction. Therefore, when viewed from the 45 degrees direction, the degradation of the contrast in the vertical alignment mode is more noticeable than in the IPS mode liquid crystal display device.

FIG. 1 shows computation results for contrast lines in the conventional vertical alignment mode liquid crystal display device. The black portion shows a region where the contrast is 50 or more. It is proved that a decline in the contrast at an angle of 45 degrees with respect to the polarizing axis of the polarizing plate occurs in four directions, i.e., azimuth angles of 0 degree, 90 degrees, 180 degrees and 270 degrees. As a result of the decline in the contrast in the four directions, an inversion of luminance occurs in the region ranging from black to intermediate tone. Such decline in the contrast in the four directions is the drawback of the vertical alignment mode liquid crystal display device which exhibits an excellent visual angle property. The object of the present invention is to provide a vertical alignment mode liquid crystal display device which is capable of perfectly achieving a contrast compensation within the region ranging all over the azimuth angles of 360 degrees and at the region ranging from the polar angle of 0 to 80 degrees.

SUMMARY OF THE INVENTION

The present invention relates to a liquid crystal display device which comprises a first polarizing plate having a transmitting axis in a specified direction; an optically biaxial anisotropic sheet; a liquid crystal layer formed of vertically aligned nematic liquid crystal molecules possessing a negative dielectric anisotropy, in this order; and a second polarizing plate having transmitting axis perpendicular to the foregoing specified direction; an optically uniaxial anisotropic sheet selectively being provided either between the foregoing liquid crystal layer and the foregoing optically biaxial anisotropic sheet or between the foregoing liquid crystal layer and the foregoing second polarizing plate.

The present invention relates further to a liquid crystal display device in which a retardation of the optically uniaxial anisotropic sheet ranges from 75 to 100% of that of the foregoing liquid crystal layer.

Still further, the present invention relates to a liquid crystal display device in which an in-plane retardation of the foregoing optically biaxial anisotropic sheet is from 190 to 390 nm.

Still even further, the present invention relates to a liquid crystal display device in which a retardation in a thickness direction of the foregoing optically biaxial anisotropic sheet is from 0.28 to 0.67.

Yet even further, the present invention relates to a liquid crystal display device in which an in-plane retardation of the foregoing optically biaxial anisotropic sheet is from 205 to 315 nm, and a retardation in a thickness direction of the foregoing optically biaxial anisotropic sheet is from 0.3 to 0.65.

Still further, the present invention relates to a liquid crystal display device in which an in-line retardation axis of the foregoing optically biaxial anisotropic sheet is approximately parallel to the transmitting axis of either the foregoing first or second polarizing plate.

The present invention even further relates to a liquid crystal display device in which the foregoing optically uniaxial anisotropic sheet is provided integrally with the foregoing second polarizing plate.

And further, the present invention relates to a liquid crystal display device in which the foregoing optically uniaxial anisotropic sheet is tri-acetyl cellulose.

BRIEF DESCRIPTION OF THE DRAWINGS

Preferred embodiments of the present invention will now be described, by way of example only, with reference to the accompanying drawings in which:

FIG. 4 shows a different layered structure of a liquid crystal display device according to the present invention.

DETAILED DESCRIPTION OF THE PREFERRED EMBODIMENTS OF THE INVENTION

The embodiments of the present invention will be described below with reference to the accompanying drawings.

There exists different types of liquid crystal display devices. A bright display in which a light transmits through a liquid crystal layer at its maximum is easier to realize than a dark display in which the light is shielded by the liquid crystal layer at its maximum. That is, a white displaying state is realized more easily than a black displaying state. Therefore, in order to enhance the displaying contrast, it is exceedingly essential to increase a density of the black display. In each style of the liquid crystal displaying, a variety of considerations on how to achieve an excellent black display have been made. In the liquid crystal display device of the twisted nematic mode which has been heretofore used, the liquid crystal molecules are in a rotated state or in a vertical alignment state depending on supplying of a current. The black display in the homogeneous vertical alignment state of the liquid crystal molecules is easier to realize than the black display in the rotated state thereof. For this reason, many liquid crystal display devices utilize a structure in which black is displayed in the vertical alignment state at the time of current supply. To realize this, polarizing plates are disposed on the upper and lower surfaces of the liquid crystal layer, so that their polarizing axes intersect at a right angle. In this case, light transmits through one polarizing plate and is linearly polarized. The linearly polarized light rotates in the liquid crystal layer when there is a current supply, and then it is emitted from the polarizing plate on the opposite side, resulting in a white display. Such structure is called a normally white. On the contrary, in the IPS mode liquid crystal display device and the vertical alignment mode liquid crystal display device, since the liquid crystal molecules offer a homogeneous orientation, the structure in which the black is displayed when there is no current supply, that is, a normally black, can be more easily adjusted. Therefore, In the IPS and vertical alignment mode liquid crystal display devices, the structure of the normally black is employed more widely.

Figure 2:
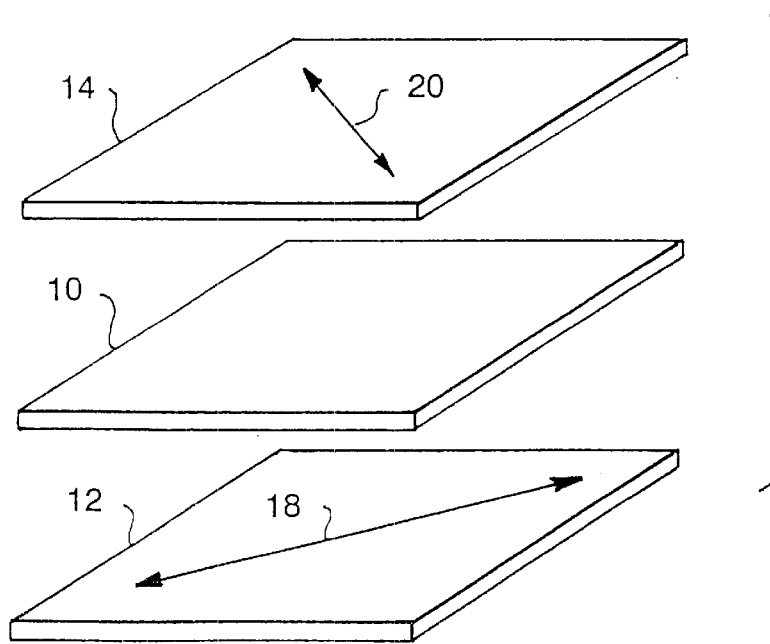
FIG. 2 shows a layered structure of the conventional liquid crystal display device.

FIG. 2 is a structure of the conventional vertical alignment mode liquid crystal display device. Two polarizing plates 12 and 14 are disposed on the two sides of liquid crystal layer 10. The liquid crystal layer 10 is inserted between two electrodes (not shown). The transmitting axis 18 of the polarizing plate 12 is perpendicular to the transmitting axis 20 of the polarizing plate 14. A light incident onto the polarizing plate from the front thereof is linearly polarized with a plane of polarization in the direction of the transmitting axis. Since the plane of polarization and the liquid crystal retardation axis tend to be the same direction or they are perpendicular to each other, the linearly polarized light transmits through the liquid crystal layer 10 without rotating its plane of polarization, and is shielded by the polarizing plate on the other side. Thus, a black display can be achieved.

However, a light incident onto the polarizing plate obliquely is not shielded by the polarizing plate on the other side. The inventors analyzed the cause. The inventors theoretically, established a method in order to completely and easily perform a compensation of the black state in the vertical alignment mode liquid crystal display device based on the following concept. Specifically, first, in order to eliminate the retardation of the liquid crystal layer in the direction of 45 degrees relative to the polarizing axis of the polarizing plate, the compensation is made using an optically uniaxial anisotropic sheet. With this, the linearly polarized light remains as it is even after passing through the liquid crystal layer and the optically uniaxial anisotropic sheet. Secondly, an optically biaxial anisotropic sheet like a $\lambda/2$ plate having a retardation axis which is either perpendicular to or parallel to the transmitting axis of the polarizing plate is added. With this, the polarizing axis of the linearly polarized light can be rotated to a direction in which the linearly polarized light is perfectly shielded by the polarizing plate on the side from where the light emits.

Figure 3:
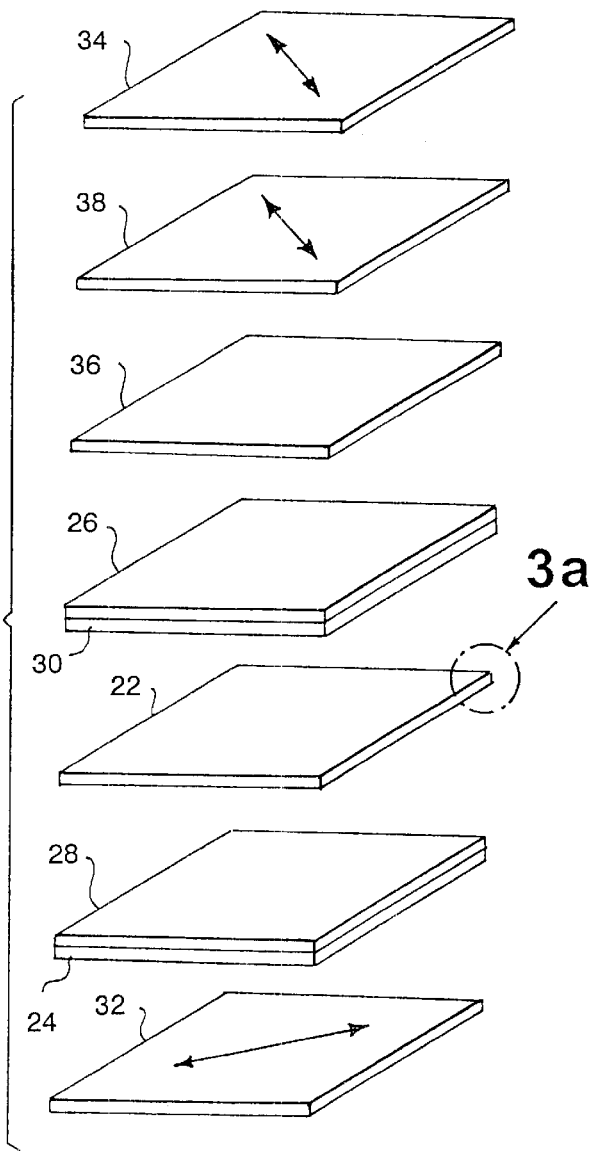
FIG. 3 shows a layered structure of a liquid crystal display device according to the present invention.
Figure 3A:
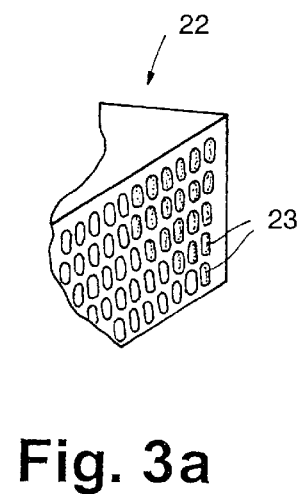

FIGS. 3 and 4 show a layered structure of a liquid crystal display panel of the present invention. Electrodes 28 and 30 are provided on the surfaces of the substrates 24 and 26 respectively. The liquid crystal layer 22 formed of vertically aligned nematic liquid crystal molecules 23 offering a nematic dielectric anisotropy, is inserted between this pair of the substrates and the electrodes. Polarizing plates 32 and 34 are provided at the outermost side of the device. An optically uniaxial anisotropic sheet 36 is disposed at the position adjacent to either the substrate 26 or the substrate 24, and the optically biaxial anisotropic sheet 38 is disposed at the position adjacent to the polarizing plate 34.

A first compensation due to the optically uniaxial anisotropic sheet will be described. Let the polar angle be $\theta$, retardation $\Delta n$ of the liquid crystal layer is expressed by the following equation.

$$\Delta n = \{none/(no^2 \sin^2 \theta + ne^2 \cos^2 \theta)^{1/2}\} - no$$

where ne is a refractive index of the liquid crystal layer in an extraordinary light, and no is a refractive index of the liquid crystal layer in an ordinary light. Therefore, a retardation of the liquid crystal layer when viewed from an oblique direction is as follows.

$$\Delta nd(LC) = \Delta n \ast d/\cos \theta$$

where d is the thickness of the liquid crystal layer. Retardation of the optically uniaxial anisotropic sheet when viewed from an oblique direction is as follows.

$$\Delta nd(Film) = \Delta N \ast D/\cos \theta$$

where D is the thickness of the optically uniaxial anisotropic sheet, and $\Delta N$ is expressed by the following equation.

$$\Delta N = \{NoNe/(No^2 \sin^2 \theta + Ne^2 \cos^2 \theta)^{1/2}\} - No$$

The following equation must be established for compensating the retardation of the liquid crystal layer by means of the optically uniaxial anisotropic sheet.

$$\Delta nd (LC) + \Delta nd (Film) = 0$$

Therefore, it is assumed that the liquid crystal layer offers a positive refractive index anisotropy. Specifically, when ne>no is established, Ne<Ne must be satisfied for the sheet. In other words, the sheet must possess a negative refractive index anisotropy.

A second compensation due to the optically biaxial anisotropic sheet will be described. When viewed obliquely, the polarizing axes of the polarizing plates which are at a right angle apparently look as if they are not at a right angle. A light incident obliquely onto the device from the polarizing plate includes a component parallel to the transmitting axis of the polarizing plate on the opposite side. Therefore, light is not completely shielded by the polarizing plate on the opposite side, and this unshielded light transmits through the polarizing plate on the opposite side, so that an excellent black displaying is not achieved, resulting in a low contrast. The fact that the light obliquely incident onto the polarization plate includes the component parallel to the transmitting axis of the polarization on the opposite side can be intuitively understood from the following fact. Specifically, when viewed from above, although the arrows form a character 'X' in which they intersect at a right angle look as they are, and when viewed obliquely, the character 'X' looks distorted, and angle formed by the two arrows is different from 90 degrees. In order to avoid the decline in the contrast caused when viewed obliquely, an optical compensation sheet of an optically biaxial anisotropic possessing the following property is provided between the liquid crystal layer and the polarizing plate.

The optically biaxial compensation sheet of the present invention is used to rotate the polarizing axis of the linearly polarized light. When obliquely incident light that is linearly polarized by the polarizing plate directly reaches to the polarizing plate on the opposite side, its polarizing axis is not perpendicular to the transmitting axis of the polarizing plate on the opposite side. Therefore, the linearly polarized light is rotated on the way before reaching to the polarizing plate on the opposite side. Particularly, the optical compensation sheet should have the properties similar to that of a $\lambda/2$ plate. The $\lambda/2$ plate shows a retardation having a value equal to $\Delta nd = \lambda/2$ ($\lambda$: a wavelength of a light), which possesses a property that the linearly polarized light having a plane of polarization deviated from the retardation axis of the $\lambda/2$ plate by $\Phi$ is rotated by $2\Phi$ when it is incident thereonto. Here, $$\Delta nd = (nx - ny) \ast d$$

where nx is a refractive index in a direction (x-axis) where the refractive index is maximum in the plane of the sheet, ny is a refractive index in a direction (y-axis) perpendicular to the x-axis in the plane of the sheet, and d is the thickness of the sheet. As the retardation of the optical compensation sheet is closer to $\lambda/2$, the light arriving at the polarizing plate on the light emission side becomes more closely akin to the linearly polarized light. The optical compensation sheet used for the liquid crystal display device of the present invention offers the retardation value equal to the half of 380 to about 780 nm which is a wavelength range of a visible light, i.e., about 190 to about 390 nm. Such sheet will exhibit a satisfactory function. The sheet has an ability to improve the contrast for the visible light when viewed obliquely, and to enhance the visual angle property.

The amount of shift of the polarizing axis of the linearly polarized light from the transmitting axis of the polarizing plate on the light emission side, which is perpendicular t the polarizing axis of the linearly polarized light can be compensated by the optically biaxial anisotropic sheet equivalent to a $\lambda/2$ plate. Specifically, the linearly polarized light which shifted from the direction perpendicular to the transmitting axis is of the polarizing plate due to viewing obliquely, is rotated back to the perpendicular direction by the optically biaxial anisotropic sheet. The rotated-back light arrives at the polarization plate on the light emission side while maintaining a linearly polarized state. Thus, it becomes possible to enhance the black display. Such the optically biaxial anisotropic sheet has no optical effect on a light which is incident onto the polarizing plate from a direction perpendicular to the plate, and the sheet exhibits as a $\lambda/2$ plate an effect on a light which is incident thereonto obliquely. With regard to this point, the description will be made using an example where the optically biaxial anisotropic sheet is disposed so that an in-plane retardation axis thereof becomes parallel to the transmitting axis of one of the two polarizing plates when viewed from a direction perpendicular to the polarizing plates.

Figure 5:
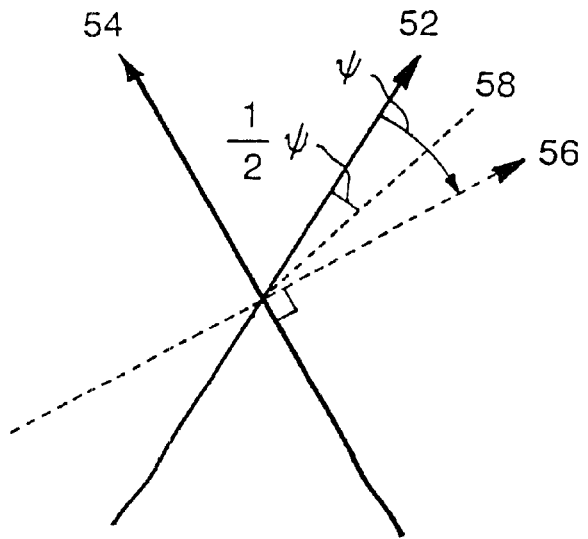
FIG. 5 shows a mutual relationship between axes of laminated bodies in the liquid crystal display device according to the present invention.

FIG. 5 shows a positional relationship between the transmitting axes 52 and 54 of the two polarizing plates 32 and 34 respectively and the retardation axis 58 of the optically biaxial anisotropic sheet 38. The optically biaxial anisotropic sheet 38 inherently possesses two characteristic polarization axes and refractive indexes corresponding to them. Among these polarization axes, an axis offering the larger refractive index is called a retardation axis. When viewed from a direction of an azimuth direction of 45 degrees, absorption axes of the upper and lower polarizing plates look like a character 'X' which is long sideways. However, since the transmitting axis of the polarization plates, that is, the polarizing axis, perpendicularly intersects the absorption axis thereof, the transmitting axes 52 and 54 form a character 'X' which is long lengthways. The reason why the retardation axis 58 of the optically biaxial anisotropic sheet shifts from the transmitting axis 52 of the polarizing plate is that the refractive index in a thickness direction of the optically biaxial anisotropic sheet differs from that in the in-plane refractive index, that is, the sheet is biaxial. The transmitting axes 52 and 54 have an angle deviating from 90 degrees by an angle $\psi$. The angle $\psi$ at the time when an azimuth angle direction is 45 degrees and a polar angle is $\theta o$ can be geometrically obtained (P. Yeh, J. Opt. Society Am., 72, P. 507 (1972)), and the angle $\psi$ is expressed by the following expression.

Expression 1

$$\phi = 2\arcsin\left[\frac{\sin^2\frac{1}{2}\theta o}{\left(1 - \frac{1}{2}\sin^2\theta o\right)^{\frac{1}{2}}}\right]$$

When an optically biaxial anisotropic sheet having a property of a $\lambda/2$ plate is used such that its retardation axis is oriented in the direction of the retardation axis 58 or perpendicular to the retardation axis 58, the angle between a plane of polarization of a light which has passed through the polarizing plate on the incident side and the retardation axis 58 of the optically biaxial anisotropic sheet is either $\psi/2$ or ($\psi/2+90$ degrees), the plane of polarization being oriented in the same direction as the transmitting axis 52. In this case, a plane of the linearly polarized light is rotated by either an angle $\psi$ or ($\psi+180$ degrees) by the optically biaxial anisotropic sheet. Therefore, the plane of polarization of the linearly polarized light coincides with the axis 56 perpendicular to the transmitting axis 54, so that it becomes possible to shield the light almost perfectly by the polarizing plate on the light emission side. Experiments were conducted based on the above-described considerations, and it is proved that the contrast becomes maximum when the retardation Nz in the thickness direction is in close to 0.5, that is, the optically biaxial anisotropic sheet possesses a property which is most akin to that of the $\lambda/2$ plate. Here, Nz is expressed by the following expression.

$$Nz=(nx-nz)/(nx-ny)$$

It is already reported that the value of the retardation does not depend on the angle when Nz is equal to 0.5 (H. Mori, P. J. Bos: IDRC'97 Digest M-88 (1997)). This means that the retardation takes the value close to $\lambda/2$ even if the direction is oblique. Therefore it is said that possessing of such the retardation Nz should be all the more preferable.

As described above, by the use of the combination of the optically uniaxial and biaxial anisotropic sheets, it is possible to achieve the complete compensation of the black state in the vertical alignment mode liquid crystal display device. With the existence of the optically uniaxial and biaxial anisotropic sheets between the two polarizing plates, an effective optical compensation can be performed. In order to achieve most excellent optical compensation, it should be preferable to study the following aspect. First, since the linearly polarized light can be rotated as it is with the use of the optimized conditioned optically biaxial anisotropic sheet, the structure in which a liquid crystal layer or an optically uniaxial anisotropic sheet is not provided between the optically biaxial anisotropic sheet and the polarizing sheet is more advantageous for completely compensating the black state. Next, in order to compensate the light, which has been affected by the retardation due to liquid crystal layer, so that it is further not affected optically, the liquid crystal layer and the optically uniaxial anisotropic sheet should be positioned adjacent to each other. Therefore, for the most preferable positional relationship, when the substrate and the electrodes are not taken into consideration, the polarizing plate 34, the optically biaxial anisotropic sheet 38, the optically uniaxial anisotropic sheet 36, the liquid crystal layer 22 and the polarization plate 32 should be arranged in the order as shown in FIG. 3, or the polarization plate, the optically biaxial anisotropic sheet, the liquid crystal layer and the optically uniaxial anisotropic sheet should be arranged in the order as shown in FIG. 4.

The optically uniaxial anisotropic sheet may be provided such that the sheet is united with the polarization plate. Since the optically uniaxial anisotropic sheet needs no alignment with the polarizing axis and the retardation axis of the liquid crystal layer, the optically uniaxial anisotropic sheet can easily exhibit inevitable functions in spite of the fact that the optically uniaxial anisotropic sheet is united with the polarizing plate. Particularly, when the polarizing plate comprises triacetyl cellulose (TAC) as a protection layer, a coated film of the polarizing plate, which is formed of triacetyl cellulose (TAC) positioned on the liquid crystal layer side, is formed to be thicker than that of an ordinary protection layer, whereby it becomes unnecessary to prepare another optically uniaxial anisotropic sheet. While the triacetyl cellulose (TAC) as the protective layer typically offers a retardation of, for example, about 50 nm, the optically uniaxial anisotropic sheet, which is necessary for canceling the retardation of the liquid crystal layer, is required to have a retardation of, for example, about 300 nm. Therefore, by providing the TAC coated film having a large thickness corresponding to the optically uniaxial anisotropic sheet, a property comparable to the optically uniaxial anisotropic sheet suitable for the present invention can be given to the polarizing plate.

The present invention will be described in more detail showing embodiments below. These embodiments show concrete examples of the present invention, and the present invention is not limited to these embodiments. In the embodiments, computations by an optical simulation using John's matrix are made.

The liquid crystal cell, the electrode, the substrate, the polarizing plate and the like which have heretofore been used for the conventional vertical alignment mode liquid crystal display device can be used for the device of the present invention without any modification. The liquid crystal cells are vertically orientated, and liquid crystal possessing a negative dielectric anisotropy are used. Those developed for the vertical alignment liquid crystal display device and available in the market may be used. Physical property of the liquid crystal cell is set such that $\Delta n$ of the liquid crystal is 0.081, $\Delta \epsilon$ is −4.6, and a cell gap of the liquid crystal layer is 4.8 $\mu$m. $\Delta nd$ of the liquid crystal at this time is 0.39 $\mu$m. Each pixel is divided by the multi-domain technology. As the multi-domain technology, the one using a protrusion is suitable because of unnecessity of rubbing. It is seen the polarizing axes of the upper and lower polarizing plates are perpendicular to each other. $\Delta nd$ of the optically uniaxial anisotropic sheet in the z-axis direction is −0.35 $\mu$m, $\Delta nd$ of the x and y-plane of the optically biaxial anisotropic sheet is 275 nm, Nz of the optically biaxial anisotropic sheet is 0.5, and the retardation axis on the x and y-plane of the optically biaxial anisotropic sheet is parallel to the polarizing axis of one of the polarizing plates.

Figure 1:
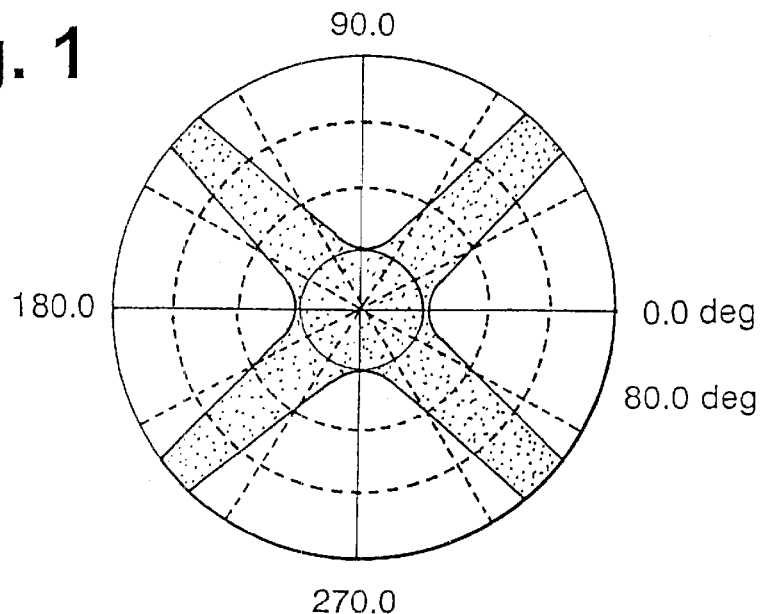
FIG. 1 is a graph showing a contrast curve of a conventional liquid crystal display device.
Figure 6:
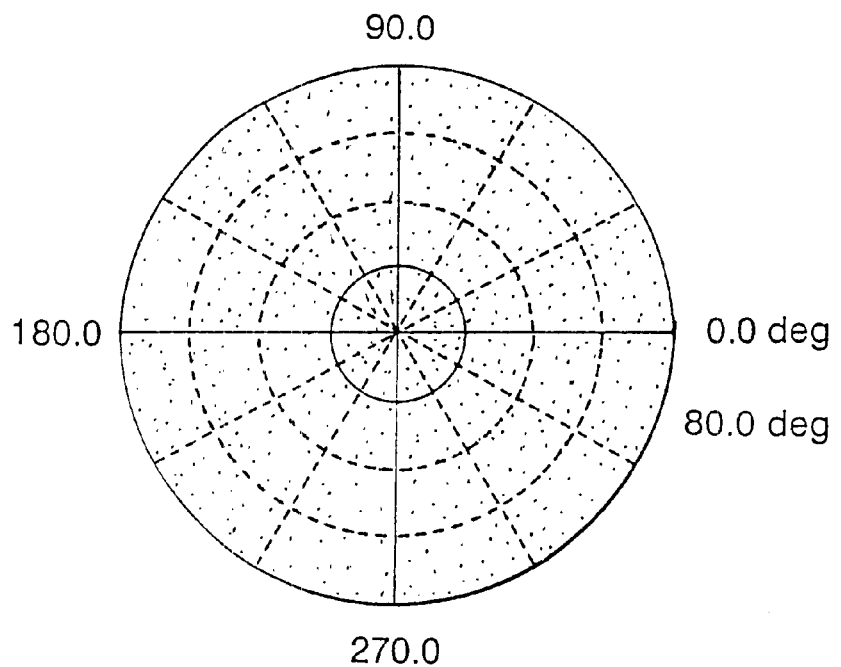
FIG. 6 is a graph showing a high contrast region of the liquid crystal display device according to the present invention.

In the above-described manner, when optical computations are performed using a wavelength of 550 nm that is a typical value of a visible light, a reduction in a black concentration never occurs in the black state, that is, in power off state, so that the device has an ability to perform the optical compensation in all directions. While FIG. 1 shows the computation result in the case where no sheet is used, FIG. 6 shows the results of the visual angle property of the contrast in the case where the sheet of the present invention is used. In FIGS. 1 and 6, the results as to the range of all azimuth angles at 0 to 80 degrees of the polar angle are shown, in which the black portion depicts the region where the contrast is 50 or more.

Figure 7:
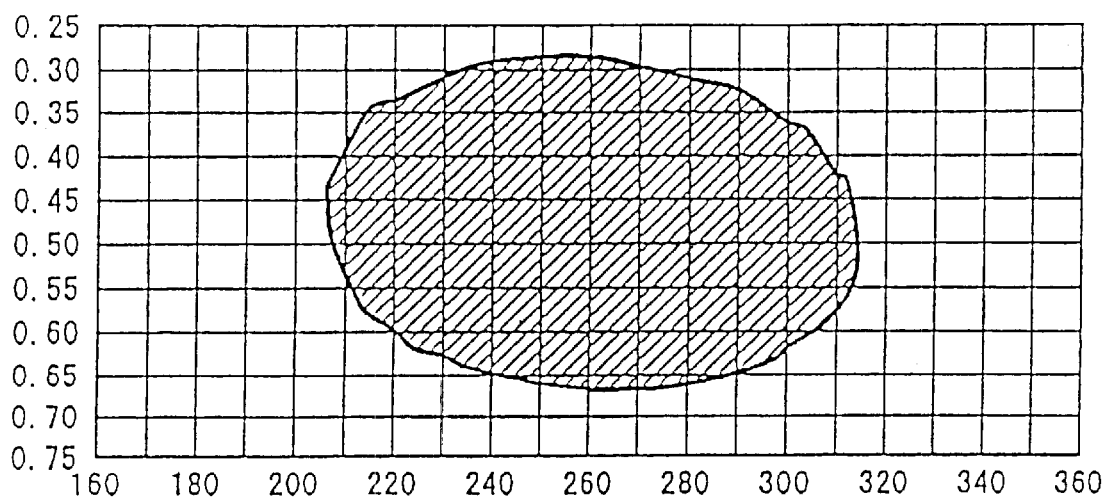
FIG. 7 is a graph showing a contrast curve of the liquid crystal display device according to the present invention.

The optically biaxial anisotropic sheet used in the present invention ideally exhibits the most excellent effect when (nx−ny)×d=270 rim is established and Nz=0.5 is established. FIG. 7 shows the values of the contrast when (nx−ny)×d (the axis of abcissasas) and Nz (the axis of ordinates) are varied. The portion illustrated by the slanted lines shows the one where the contrast is 10 or more when the azimuth angle is 90 degrees and the direction of the polar angle is 80 degrees. It is proved that effect is significant when (nx−ny)×d ranges from 200 to 320 nm and Nz ranges from 0.25 to 0.7 around the portion where (nx−ny)×d=270 nm and Nz=0.5 are established.

Figure 8:
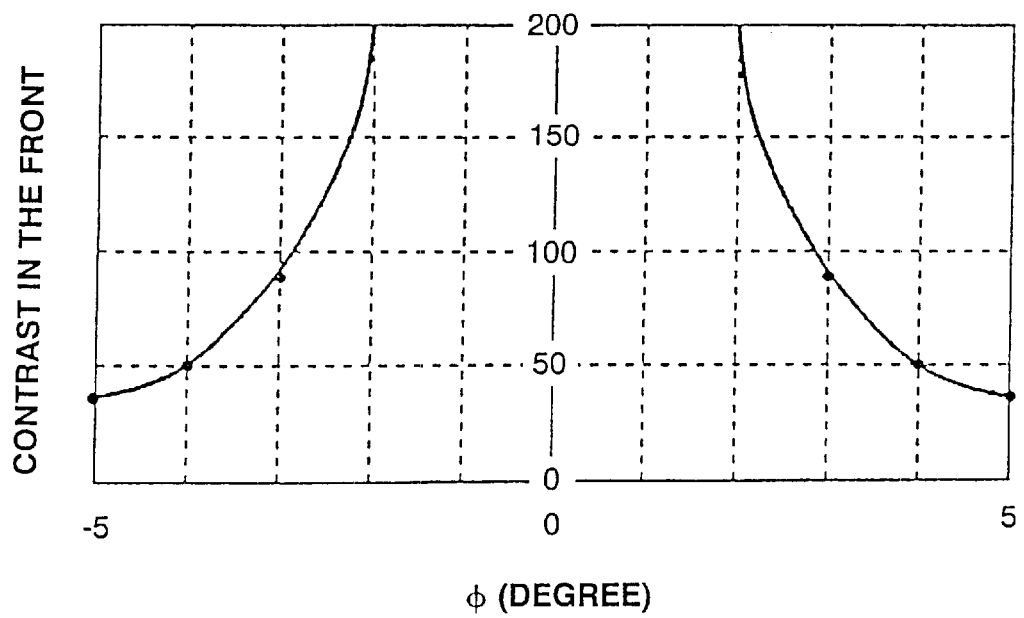
FIG. 8 is a graph showing a contrast curve of the liquid crystal display device according to the present invention.

It is desirable that the optically biaxial anisotropic sheet should be as parallel as possible with the polarizing axis of one of the upper and lower polarizing plates. However, for practical use, it is sufficient that the optically biaxial anisotropic sheet may be inclined by an angle of ±2 degrees from the polarizing axis. FIG. 8 shows the relationship between the front contrast and the angle $\Phi$ formed by the polarizing axis of the polarizing plate and the retardation axis of the sheet. In the range of the deviation of the sheet from the polarizing axis of the polarizing plate within ±2 degrees, the value equal to 100 or more is obtained for the front contrast, and the optically biaxial anisotropic sheet can be used in this range of $\Phi$.

Figure 9:
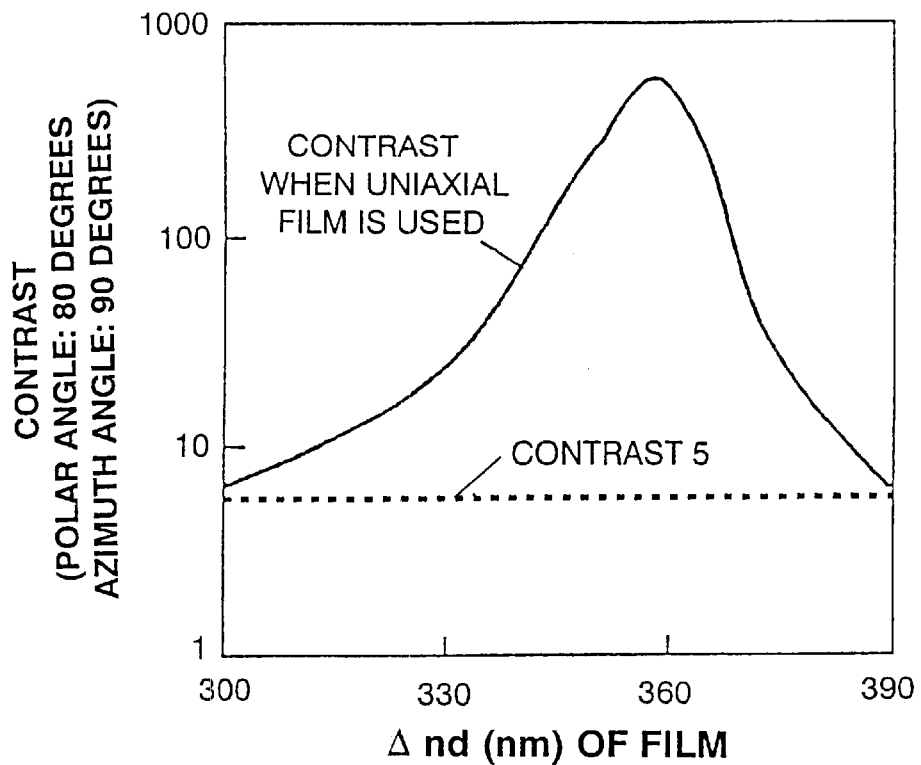
FIG. 9 is a graph showing a relationship between Δnd and the contrast of an optically uniaxial anisotropic sheet.
Figure 10:
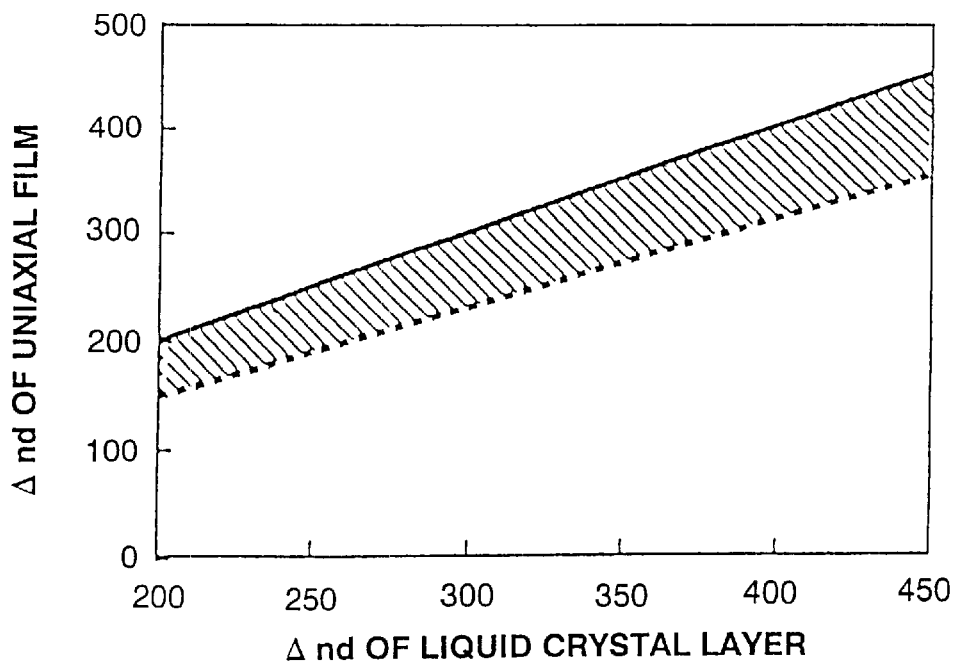
FIG. 10 is a graph showing a relationship between Δnd of a liquid crystal layer and Δnd of the optically uniaxial anisotropic sheet.

It is possible to compensate the black level by changing the retardation value of the optically uniaxial anisotropic sheet even when $\Delta nd$ of the liquid crystal layer differs. FIG. 9 is the results after obtaining the relationship $\Delta nd$ of the optically uniaxial anisotropic sheet and the contrast when $\Delta nd$ of the liquid crystal layer is 390 nm. In this case, the contrast is polar angle 80 degrees and the azimuth angle 90 degrees. $\Delta nd$ of an actual sheet takes a negative value, and FIG. 9 shows an absolute value of $\Delta nd$ on its axis of abscissas. $\Delta nd$ of an optimum sheet is about 355 nm, and the contrast equal to 5 or more is obtained when it is in the range of 300 to 390 nm. $\Delta nd$ of a desirable optically uniaxial anisotropic sheet is in a range shown by the slanted lines of FIG. 10. As is understood from FIG. 10, when $\Delta nd$ of the optically uniaxial anisotropic sheet is 75 to 100% of $\Delta nd$ of the liquid crystal layer, remarkable effects owing to the use of the optically uniaxial anisotropic sheet can be obtained.

The combination of the optically uniaxial and biaxial anisotropic sheet makes it possible for the vertical alignment mode liquid crystal display device to enhance the visual angle property in the oblique direction without any change of the property in the straight direction, even when the device uses only one optically biaxial anisotropic sheet.

The point that the complete compensation is possible in spite of the use of only one optically biaxial anisotropic sheet is advantageous as described below. First, since the optically biaxial anisotropic sheet is in general more expensive than the optically uniaxial anisotropic sheet, a cost can be reduced. Secondly, since the use of one optically biaxial anisotropic sheet requiring the alignment adjustment is satisfactory, manufacturing processes can be simplified. Thirdly, the optically biaxial anisotropic sheet need not to be changed even when $\Delta nd$ of the liquid crystal layer is changed, it is possible to cope with the change of $\Delta nd$ of the liquid crystal layer by changing the optically uniaxial anisotropic sheet the retardation of which can be easily adjusted. Furthermore, the optically uniaxial anisotropic sheet can be easily united with the polarizing plate, and, as a result, the sheet can be advantageously omitted. The polarizing axis of the polarizing plate and the optically biaxial anisotropic sheet adjacent thereto may be perpendicular to each other constitutionally, as well as parallel with each other, a margin in designing the device can be increased.

Furthermore, by using the optically biaxial anisotropic sheet having a predetermined retardation, theoretically perfect optical compensation can be achieved.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A liquid crystal display device comprising:
   a first polarizing plate having a transmitting axis in a specified direction;
   an optically biaxial anisotropic sheet;
   a liquid crystal layer formed of vertically oriented nematic liquid crystal molecules possessing a negative dielectric anisotropy; and
   a second polarizing plate having a transmitting axis perpendicular to said specified direction, in this order;

an optically uniaxial anisotropic sheet selectively being provided either between said liquid crystal layer and said optically biaxial anisotropic sheet or between said liquid crystal layer and said second polarizing plate; and, wherein:

retardation of said optically uniaxial anisotropic sheet and retardation of said liquid crystal layer have opposite polarity and an absolute value of the retardation of said optically anisotropic uniaxial sheet ranges from 75 to 100% of that of said liquid crystal layer.

2. The liquid crystal display device according to claim 1, wherein an in-plane retardation of said optically biaxial anisotropic sheet is from 190 to 390 nm.

3. The liquid crystal display device according to claim 2, wherein a retardation in a thickness direction of said optically biaxial anisotropic sheet is from 0.28 to 0.67.

4. The liquid crystal display device according to claim 1, wherein an in-plane retardation of said optically anisotropic biaxial sheet is from 205 to 315 nm, and a retardation in a thickness direction of said optically biaxial anisotropic sheet is from 0.3 to 0.65.

5. The liquid crystal display device according to claim 1, wherein said optically uniaxial anisotropic sheet is provided integrally with said second polarizing plate.

6. The liquid crystal display device according to claim 1, wherein said optically uniaxial anisotropic sheet is tri-acetyl cellulose.

* * * * *